United States Patent
Takemura

(10) Patent No.: US 7,484,585 B2
(45) Date of Patent: Feb. 3, 2009

(54) VEHICLE OCCUPANT RESTRAINT APPARATUS

(75) Inventor: Naotoshi Takemura, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 163 days.

(21) Appl. No.: 11/732,436

(22) Filed: Apr. 3, 2007

(65) Prior Publication Data

US 2007/0228713 A1    Oct. 4, 2007

(30) Foreign Application Priority Data

Apr. 3, 2006    (JP)    .............................. 2006-102249

(51) Int. Cl.
*B60R 22/46* (2006.01)
*B60R 22/48* (2006.01)
*B69R 22/195* (2006.01)

(52) U.S. Cl. .................. 180/268; 280/806; 280/807; 297/480; 297/475; 701/45; 180/271

(58) Field of Classification Search .................. 280/806, 280/807; 180/268, 271; 701/45; 297/474, 297/475, 480
See application file for complete search history.

(56) References Cited

U.S. PATENT DOCUMENTS

| | | | | |
|---|---|---|---|---|
| 2001/0025735 A1* | 10/2001 | Midorikawa et al. | ........ | 180/268 |
| 2003/0094534 A1* | 5/2003 | Fujii et al. | ............... | 242/390.9 |
| 2004/0056471 A1* | 3/2004 | Bullinger et al. | ............ | 280/806 |
| 2004/0251367 A1* | 12/2004 | Suzuki et al. | ............ | 242/390.8 |

FOREIGN PATENT DOCUMENTS

JP    2004-74957    3/2004

* cited by examiner

*Primary Examiner*—Ruth Ilan
(74) *Attorney, Agent, or Firm*—Carrier, Blackman & Associates, P.C.; Joseph P. Carrier; William D. Blackman

(57) ABSTRACT

A vehicle occupant restraint apparatus includes a controller for controlling a reversible occupant restraint so as to restrain an occupant when three conditions are met, i.e., a first condition that the steering angle of a steering wheel has exceeded a steering angle threshold, a second condition that the steering angle speed has exceeded a steering angle speed threshold, and a third condition that the steering angle acceleration has exceeded a specific steering angle acceleration threshold.

5 Claims, 10 Drawing Sheets

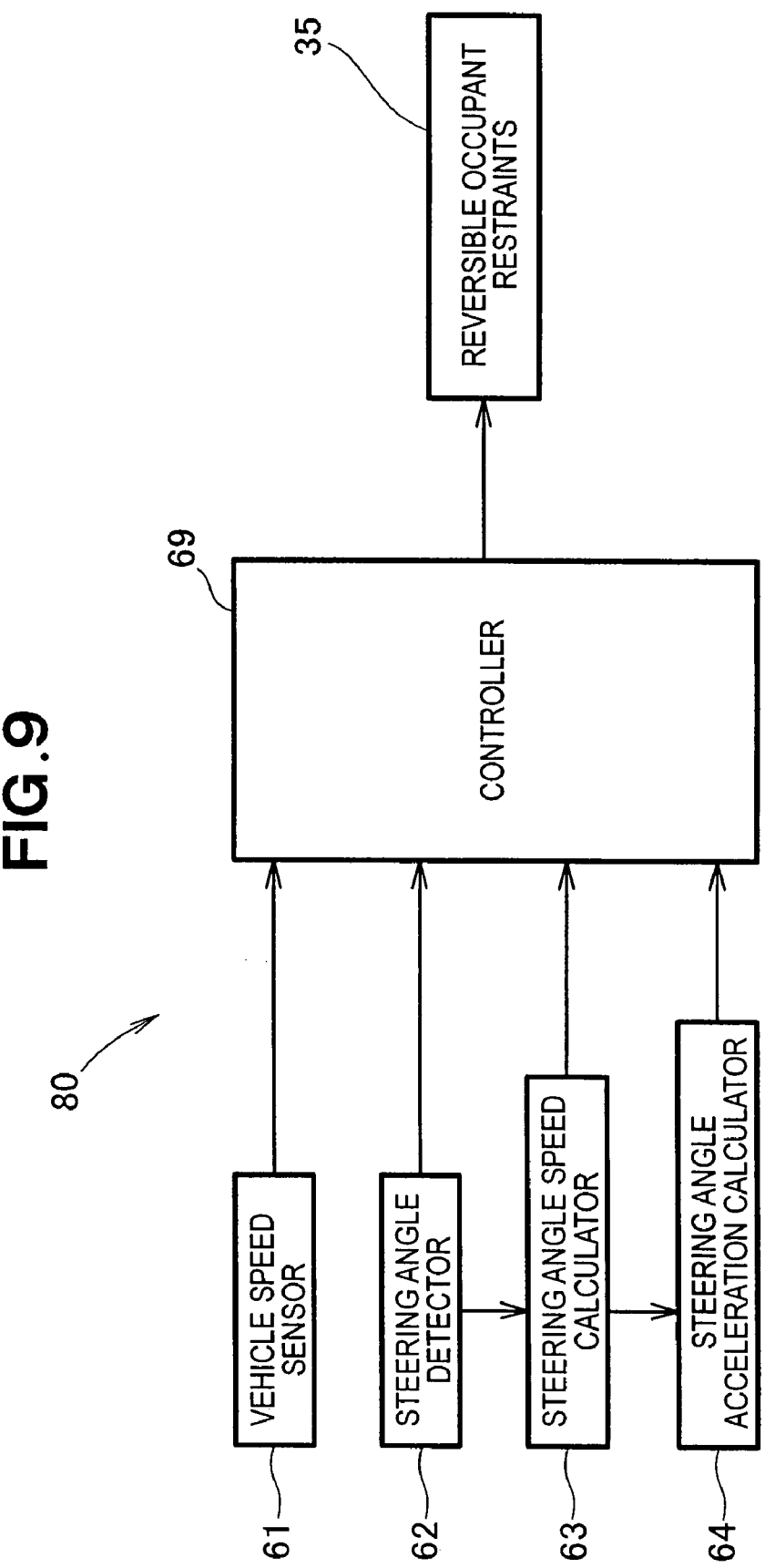

VEHICLE OCCUPANT RESTRAINT APPARATUS

FIELD OF THE INVENTION

The present invention relates to a vehicle occupant restraint apparatus which is designed to maintain the posture of the occupant when the steering wheel is suddenly or quickly turned a large amount.

BACKGROUND OF THE INVENTION

A seatbelt apparatus is an example of a vehicle occupant restraint apparatus. In a commonly used seatbelt apparatus, an occupant sitting in the seat is restrained by a seatbelt when the vehicle has collided or when a collision is anticipated.

Recently, tests have been conducted in an attempt to have seatbelt apparatuses operate when various other conditions are met aside from a vehicle collision. For example, JP 2004-74957 A discloses a technique wherein the force for restraining the occupant with the seatbelt is increased when the driver performs an emergency maneuver by suddenly applying the brakes or turning the steering wheel.

In the technique disclosed in JP 2004-74957 A, it is determined that the driver has performed an emergency maneuver and the tension in the seatbelt is increased when three conditions are met. These three conditions are that the vehicle speed be equal to or greater than a specific value, that the operating member operated by the driver be operated in an amount equal to or greater than a specific value, and that the speed with which the operating member is operated be equal to or greater than a specific value.

A summary of the vehicle occupant restraint apparatus disclosed in JP 2004-74957 A is described hereinbelow with reference to FIG. 11 hereof. A conventional vehicle occupant restraint apparatus 200 is composed of a vehicle speed sensor 201 for sensing the vehicle speed, a stroke sensor 203 for sensing the depression stroke of a brake pedal 202, a master cylinder 204 for increasing master cylinder pressure (braking hydraulic pressure) in accordance with the depression force of the brake pedal 202, a hydraulic pressure sensor 205 for sensing the master cylinder pressure, and a seatbelt apparatus 206. A wheel cylinder 209 is driven by the master cylinder pressure.

The seatbelt apparatus 206 is composed of a motor 207 for windably driving the seatbelt, and a seatbelt control device 208 for controlling the motor 207.

The seatbelt control device 208 controls the motor 207 to increase the tension in the seatbelt when a determination is made that three conditions are met. The first condition is that the vehicle speed be equal to or greater than a specific value, the second condition is that the master cylinder pressure be equal to or greater than a specific value, and the third condition is that the rate of change (differential over time) in the master cylinder pressure be equal to or greater than a specific value.

The vehicle occupant restraint apparatus disclosed in JP 2004-74957 A exemplifies a modification in which the second and third conditions are modified in the following manner.

The second and third conditions of a first modification are as follows. The second condition of the first modification is that the depression stroke be equal to or greater than a specific value. The third condition of the first modification is that the rate of change (differential over time) of the depression stroke be equal to or greater than a specific value.

The second and third conditions of a second modification are as follows. The second condition of the second modification is that the steering angle of the steering wheel (not shown) be equal to or greater than a specific value. The third condition of the second modification is that the rate of change of the steering angle (steering angle speed) be equal to or greater than a specific value.

The following is a description of a case in which the techniques of the second modification are employed in a vehicle occupant restraint apparatus. The following two possibilities are examples of sudden steering (act of rapid and extensive steering) of the steering wheel by the driver. The first steering is regular sudden steering, which the driver intentionally and appropriately makes a determination to perform. The second steering is erratic steering, wherein the driver has panicked (is in a state of mental confusion).

As described above, the seatbelt control device 208 according to the second modification determines, on the basis of the three primary factors of vehicle speed, steering angle, and steering angle speed, whether the driver has performed an emergency maneuver while the vehicle is moving. However, it is difficult to appropriately and quickly conclude based on this determination alone whether the steering is first steering or second steering. The reason for this is that the steering angle and steering angle speed may temporarily increase even when the driver is using first steering.

For example, when the vehicle is turning, the steering angle and steering angle speed may temporarily increase when the driver steers in a comparatively slightly unstable manner (the steering wheel fluctuates to the left and right).

Also, when the vehicle is moving at a comparatively low speed, the steering angle and steering angle speed may temporarily increase when the driver makes a quick turn (including making a U-turn, reversing direction, and continually turning).

In the case of first steering, the steering angle and steering angle speed return to their original appropriate values in a short amount of time (return to normal in a short amount of time) despite having temporarily increased. In other words, the steering angle and steering angle speed return to their original appropriate values even through they have exceeded the determination reference values in the second and third conditions as a result abrupt steering by the driver. The seatbelt control device 208 of the second modification ends up making a hypersensitive determination in the case of first steering. Therefore, there is room for improvement in terms of being able to appropriately and quickly determining whether the occupant needs to be restrained.

In view of this, there is a need for a technique whereby it is possible to more appropriately and more quickly determine whether the occupant needs to be restrained in cases in which the driver suddenly turns the steering wheel.

SUMMARY OF THE INVENTION

According to an aspect of the present invention, there is provided a vehicle occupant restraint apparatus which comprises: a steering angle detector for detecting a steering angle of a steering device; a steering angle speed calculator for calculating a steering angle speed of the steering device; a steering angle acceleration calculator for calculating a steering angle acceleration of the steering device; a reversible occupant restraint capable of operating both in a direction of restraining an occupant and in a direction of releasing the restraining; and a controller for controlling the reversible occupant restraint, wherein the controller is designed to control the reversible occupant restraint in such a manner as to restrain the occupant when a determination is made that three conditions, a first condition that the steering angle has exceeded a predetermined steering angle threshold, a second condition that the steering angle speed has exceeded a predetermined steering angle speed threshold, and a third condition that the steering angle acceleration has exceeded a predetermined steering angle acceleration threshold, have been met.

With this arrangement, when the values of the sensed steering angle, the calculated steering angle speed, and the calculated steering angle acceleration have each exceeded their "specific thresholds"; i.e., when the three conditions have been met, the occupant can be restrained during an emergency by operation of the reversible occupant restraint.

Three thresholds, obtained by adding the steering angle acceleration threshold to the steering angle threshold and the steering angle speed threshold, are thus used as determination references for restraining the occupant, making it possible to more appropriately and more quickly determine which of the following two types of steering are in effect in cases in which the driver suddenly turns the steering wheel. The first steering is regular sudden steering, which the driver intentionally and appropriately makes a determination to perform. The second steering is erratic steering in which the driver has panicked (is in a state of mental confusion). During second steering, excessive steering angle, steering angle speed, and steering angle acceleration are used. In other words, during second steering, it can be concluded that the driver is steering with extreme force.

During first steering, the occupant is not restrained unnecessarily. Therefore, the occupant can maintain a comfortable posture.

During second steering, the occupant can be restrained by the reversible occupant restraint in an early stage. Therefore, the capacity to protect the occupant can be improved. For example, the driver can be restrained by the reversible occupant restraint to maintain the driver's posture so that the driver's posture is not changed greatly to the left or right by the centrifugal force that accompanies sudden steering. Therefore, the maneuvering of the driver can be made more stable.

Preferably, the restraint apparatus further comprises a vehicle speed detector for detecting a speed of a vehicle, and the controller changes at least one parameter selected from the steering angle threshold, the steering angle speed threshold, and the steering angle acceleration threshold to a value corresponding to the vehicle speed.

Desirably, the reversible occupant restraint restrains the occupant sitting in the driver's seat.

In a preferred form, the reversible occupant restraint is comprised of a seatbelt apparatus which is designed to perform, upon receipt of a control signal from the controller, either an operation for retracting a seatbelt by a drive force of a seatbelt electric motor, or an operation for restricting pullout of the seatbelt.

Preferably, the reversible occupant restraint is comprised of left and right side supports provided to the seat for accommodating the occupant and allowed to swing in the width direction of the vehicle, and left- and right-support electric motors for driving the left and right side supports, and the left- and right-support electric motors, upon receipt of a control signal from the controller, drive the left and right side supports in the direction in which the occupant is restrained.

BRIEF DESCRIPTION OF THE DRAWINGS

Certain preferred embodiments of the present invention will be described in detail below, by way of example only, with reference to the accompanying drawings, in which:

FIG. 9 is a circuit diagram for describing a modification of the vehicle occupant restraint apparatus shown in FIG. 3;

DESCRIPTION OF THE PREFERRED EMBODIMENTS

Figure 1:
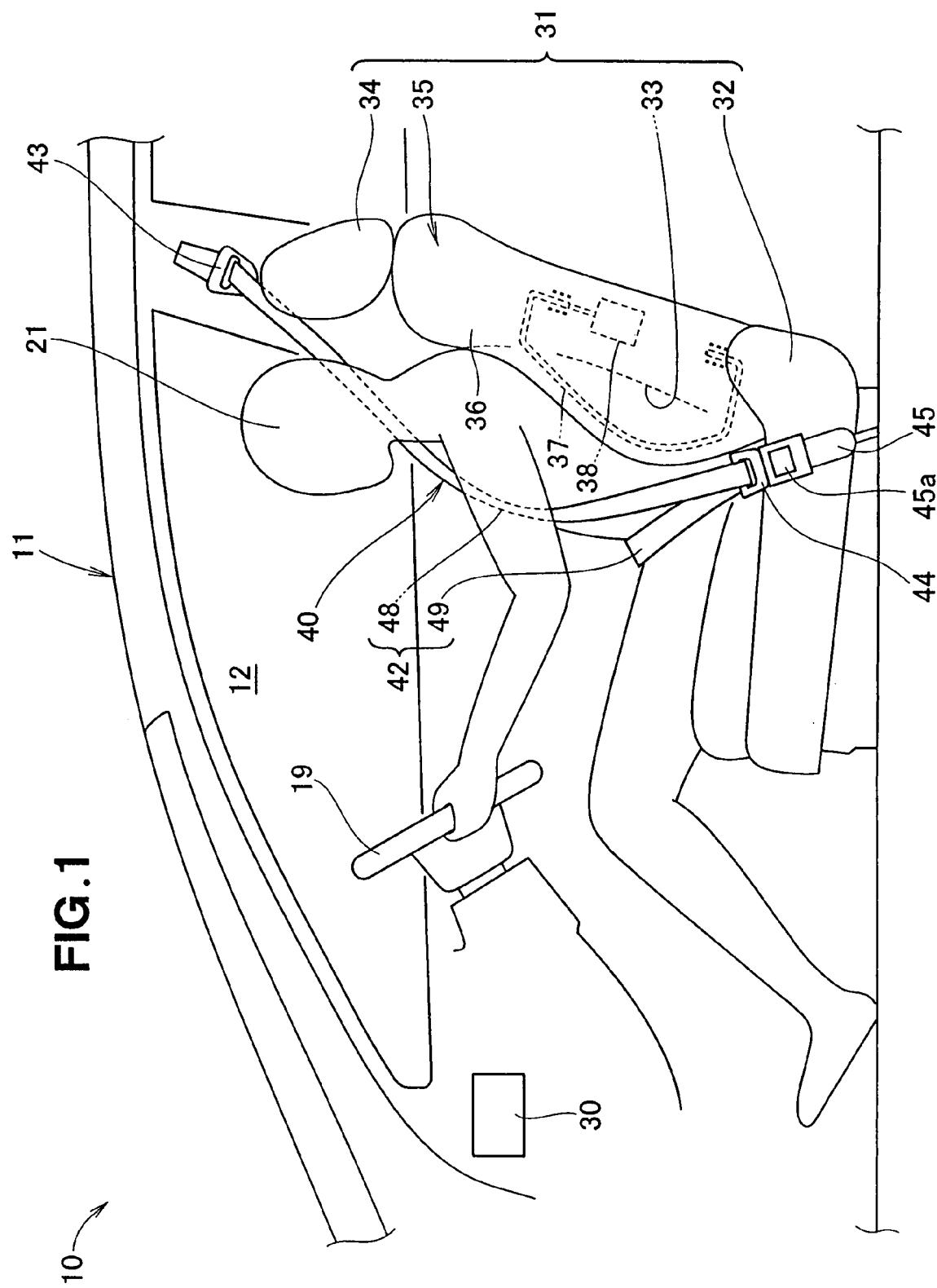
FIG. 1 is a side view of a vehicle comprising the vehicle occupant restraint apparatus of the present invention.
Figure 2:
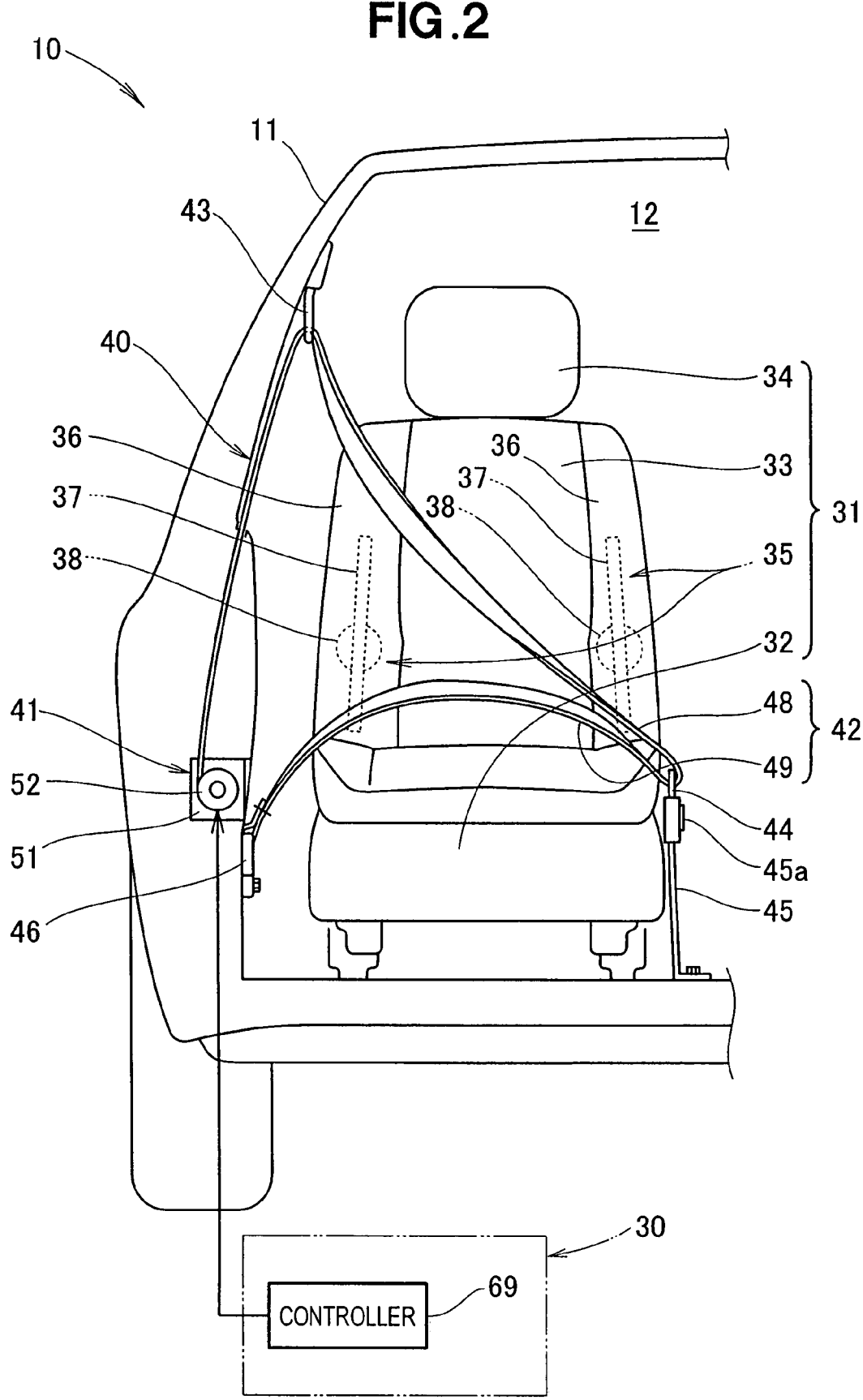
FIG. 2 is a front view of the reversible occupant restraint and the seat shown in FIG. 1.

Reference is now made to FIG. 1 showing in side elevation a steering wheel 19, a vehicle occupant restraint apparatus 30, a seat 31, and a seatbelt apparatus 40 provided to a vehicle 10 and to FIG. 2 showing the seat 31 and the seatbelt apparatus 40 disposed in the vehicle interior 12.

The seat 31 for accommodating an occupant 21 is composed of a seat cushion 32, a seatback 33, a headrest 34, and side support devices 35, as shown in FIGS. 1 and 2. The seat 31 shown in FIGS. 1 and 2 is exemplified as a driver's seat for accommodating the driver 21 (occupant 21).

The side support devices 35 are composed left and right side supports 36, 36, left and right side support frames 37, 37, and left- and right-support electric motors 38, 38.

The left and right side supports 36, 36 are disposed to the left and right of the seatback 33, and serve to restrict the tendency of the occupant 21 sitting in the seat 31 to swing to the left and right. The left and right side supports 36, 36 are configured to be capable of swinging both in the direction in which the occupant 21 sitting in the seat 31 is held and restrained on the left and right sides, and in the opposite direction in which the restraining is released.

The left and right side support frames 37, 37 are attached to the seatback 33 so as to be capable of swinging to the left and right. The left- and right-support electric motors 38, 38 swingably drive the side supports 36, 36 to the left and right via the left and right side support frames 37, 37.

Thus, the side support devices 35 have left and right side supports 36, 36 that operate both in the direction of restraining the occupant 21 and in the release direction. These devices can therefore be considered to be a single reversible occupant restraint. The side support devices 35 are hereinafter referred to as "reversible occupant restraints 35" as appropriate.

The seatbelt apparatus 40 restrains the occupant 21 sitting in the seat 31 with the aid of a seatbelt 42. In this seatbelt apparatus 40, the seatbelt 42, which simultaneously restrains the lap and one shoulder of the occupant 21, can be wound up by a retractor 41 (belt winding device 41) fixed at the bottom on the side of the vehicle frame 11.

The seatbelt apparatus 40 has a three-point support configuration wherein the seatbelt 42 is supported by three anchors, i.e., an upper anchor 43, a center anchor 45, and a lower anchor 46. The upper anchor 43 is provided at the top on the side of the vehicle frame 11. The center anchor 45 is provided at the bottom on the side of the seat 31 opposite from upper anchor 43. The center anchor 45 is composed of a one-touch mounted retaining mechanism that allows a tongue 44 to be removed from a buckle 45a on the side of the vehicle frame. The lower anchor 46 is provided at the bottom on the side of the upper anchor 43.

The retractor 41 includes an electric pretensioner 51 for quickly winding the slackened portion of the seatbelt 42. The electric pretensioner 51 winds up the slackened portion of the seatbelt 42 by means of a belt electric motor 52 in accordance with the driven state of the vehicle 10 (including emergency situations involving the vehicle 10).

The seatbelt 42 is composed of a shoulder belt 48 for restraining one shoulder of the occupant 21, and a lap belt 49 for restraining the lap of the occupant 21. This seatbelt 42 can be pulled in and out of the retractor 41 when the vehicle 10 is driven in a normal manner.

Thus, the seatbelt apparatus 40 has a seatbelt 42 that operates both in the direction of restraining the occupant 21 and in the release direction, and therefore can be considered to be a single reversible occupant restraint. The seatbelt apparatus 40 is hereinafter referred to as a "reversible occupant restraint 40" as appropriate.

Figure 3:
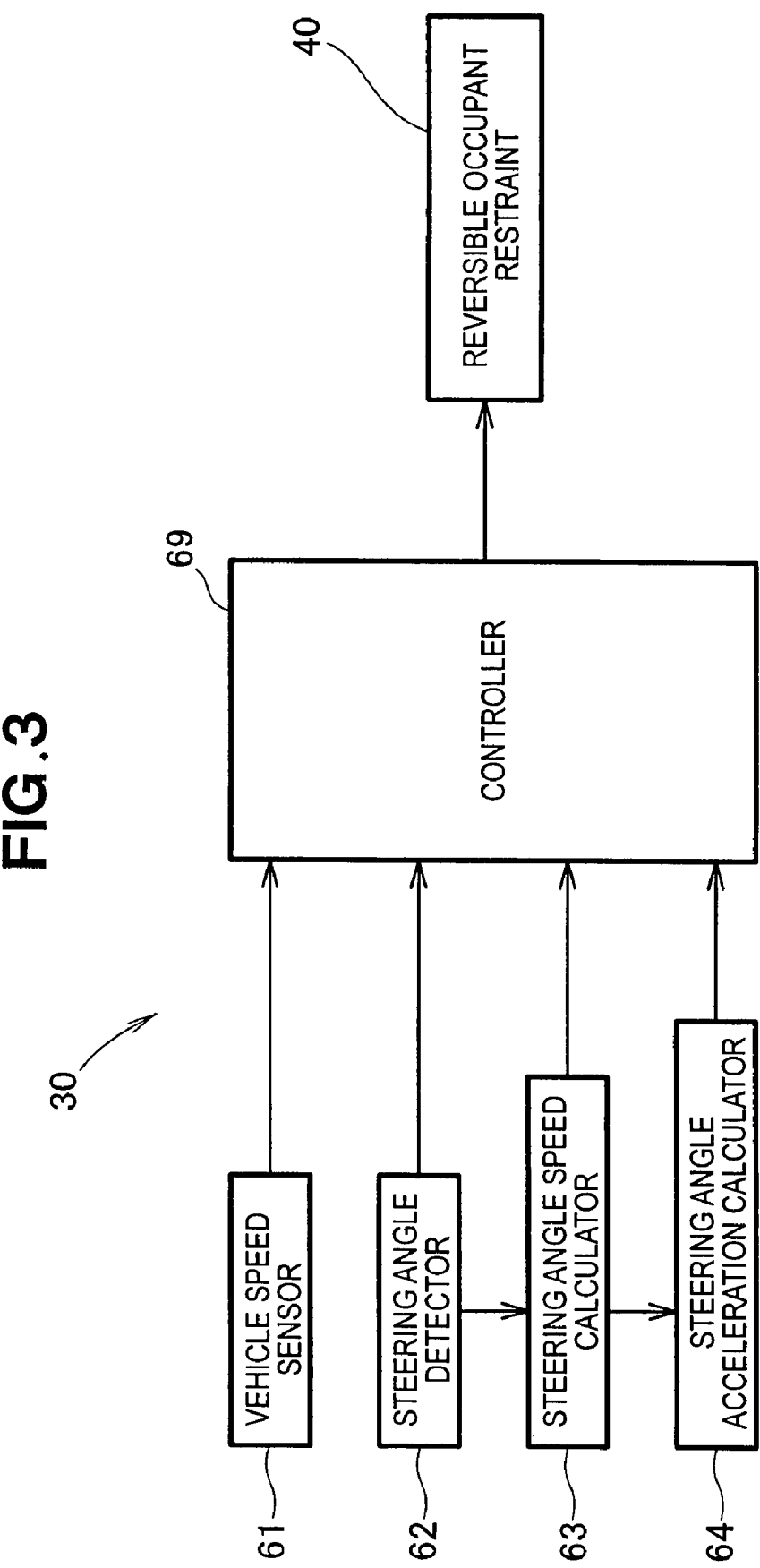
FIG. 3 is a circuit diagram of the vehicle occupant restraint apparatus shown in FIG. 2.

FIG. 3 shows the control circuitry of the vehicle occupant restraint apparatus 30.

As shown in FIGS. 1, 2, and 3, the vehicle occupant restraint apparatus 30 determines, based on information on the steering angle, the steering angle speed, and the steering angle acceleration of the steering wheel 19, whether the occupant 21 needs to be restrained. If so, the seatbelt apparatus 40 is controlled to restrain the occupant 21. The vehicle occupant restraint apparatus 30 is composed of the seatbelt apparatus 40, a vehicle speed detector 61, a steering angle detector 62, a steering angle speed calculator 63, a steering angle acceleration calculator 64, and a controller 69.

The vehicle speed detector 61 detects the speed of the vehicle 10. The steering angle detector 62 detects the steering angle (operation angle) of the steering wheel 19. The steering angle speed calculator 63 calculates the steering angle speed of the steering wheel 19. The steering angle acceleration calculator 64 calculates the steering angle acceleration of the steering wheel. The controller 69 is configured to control the seatbelt apparatus 40 on the basis of signals received from the vehicle speed detector 61, the steering angle detector 62, the steering angle speed calculator 63, and the steering angle acceleration calculator 64.

Figure 4:
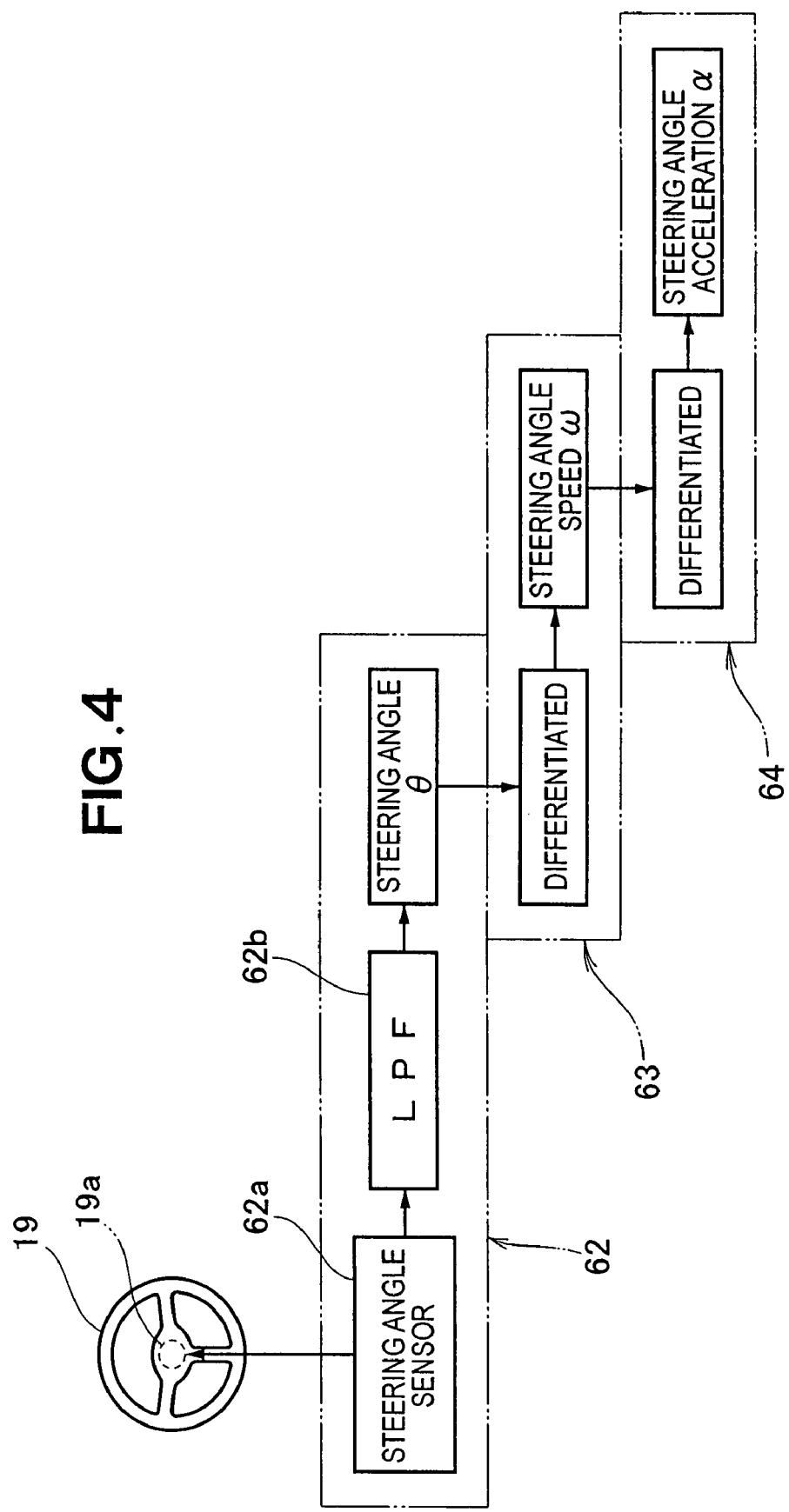
FIG. 4 is a schematic view of the steering angle detector, the steering angle speed calculator, and the steering angle acceleration calculator shown in FIG. 3.

FIG. 4 shows an example of the configuration of the steering angle detector 62, the steering angle speed calculator 63, and the steering angle acceleration calculator 64.

The steering angle detector 62 is composed of a steering angle sensor 62a and a low-pass filter 62b, for example. The steering angle sensor 62a is provided to a steering shaft 19a connected to the steering wheel 19, and senses the steering angle θ. The low-pass filter 62b removes high-frequency components from the signal of the steering angle detector 62 and smoothes the signal.

The steering angle speed calculator 63 is configured to calculate the steering angle speed ω by differentiating the steering angle θ detected by the steering angle detector 62. The steering angle acceleration calculator 64 is configured to calculate the steering angle acceleration α (changing trend of the steering angle speed ω) by further differentiating the steering angle speed ω calculated by the steering angle speed calculator 63.

The steering angle speed calculator 63 may also be configured to sense the steering angle speed directly with a sensor instead of calculating the steering angle speed ω. The steering angle acceleration calculator 64 may also be configured to sense the steering angle acceleration directly with a sensor instead of calculating the steering angle acceleration α.

Figure 5:
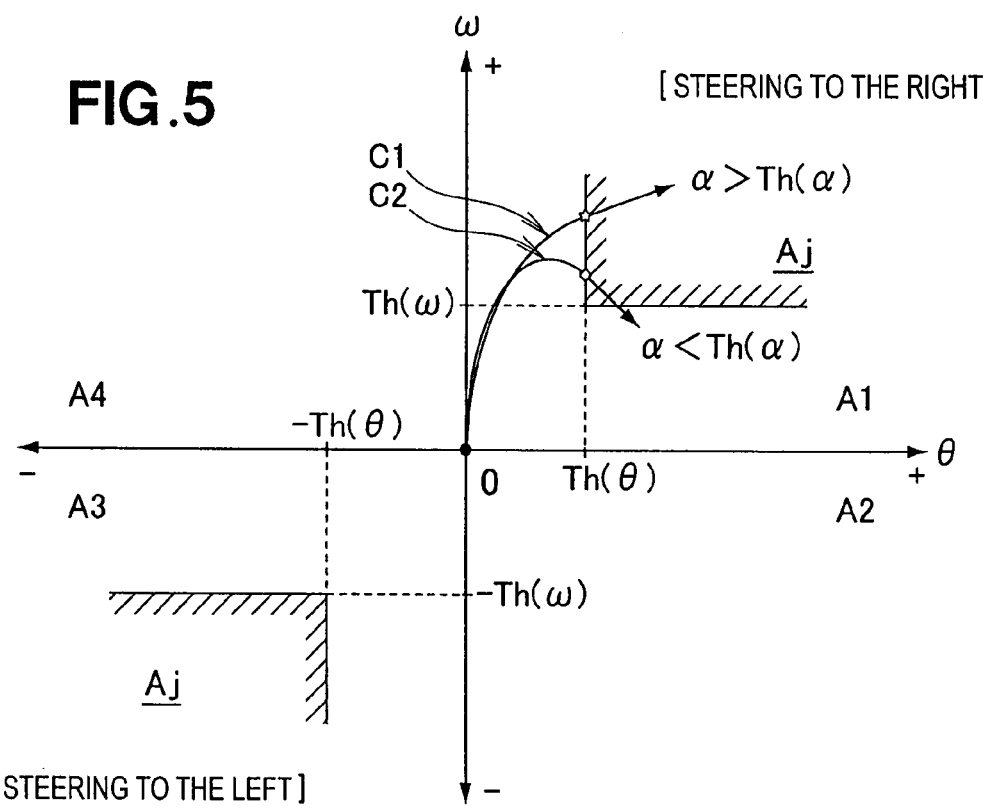
FIG. 5 is a view schematically showing a control procedure based on the vehicle occupant restraint apparatus shown in FIG. 3.

The following is a description, based on FIG. 5 and made with reference to FIG. 1, of the basic principle of controlling the seatbelt apparatus 40 with the aid of the controller 69.

FIG. 5 is a view of a steering angle characteristic curve for the steering wheel 19 (see FIG. 1), showing the correlation between the steering angle θ and the steering angle speed ω and representing the steering characteristics of the steering wheel 19 in the θ-ω coordinates, wherein the steering angle θ is plotted on the horizontal axis, and the steering angle speed ω is plotted on the vertical axis.

The steering angle θ has a value of ±0 (zero) at the point of intersection between the horizontal and vertical axes, i.e., at the point of origin. The value of the steering angle is "+" (positive) to the right of the point of origin, and "−" (negative) to the left. The steering angle speed ω has a value of ±0 at the point of origin, and has a "+" value above the point of origin and a "−" value below.

The four quadrants divided by the horizontal and vertical axes are referred to, sequentially clockwise from the top-right in the diagram, as the first quadrant A1, the second quadrant A2, the third quadrant A3, and the fourth quadrant A4.

The first quadrant A1 displays the steering angle characteristics when steering wheel 19 is turned to the right from the center position. In other words, in the first quadrant A1, the steering angle θ has a "+" value and the steering angle speed ω has a "−" value.

The third quadrant A3 shows the steering angle characteristics when the steering wheel 19 is turned to the left from the center position. The steering angle characteristics displayed in the third quadrant A3 are the inverse of the steering angle characteristics displayed in the first quadrant A1.

The steering angle characteristics have a "+" value for a right turn. The steering angle characteristics have a "−" value for a left turn. However, the absolute value of the steering angle characteristics for a left turn is the same as the value of the steering angle characteristics for a right turn.

In the first quadrant A1, a specific steering angle threshold +Th (θ) and a specific steering angle speed threshold +Th (ω) are set for a right turn. In the first quadrant A1, the area Aj in which both the steering angle threshold +Th (θ) and the steering angle speed threshold +Th (ω) are exceeded is referred to as the determination reference area Aj.

In the third quadrant A3, a specific steering angle threshold −Th (θ) and a specific steering angle speed threshold −Th (ω) are set for a left turn. The absolute value of −Th (θ) is the same as the value of +Th (θ). The absolute value of −Th (ω) is the same as the value of +Th (ω). In the third quadrant A3, the area Aj in which both the steering angle threshold −Th (θ) and the steering angle speed threshold −Th (ω) are exceeded is referred to as the determination reference area Aj.

Furthermore, two determination reference values are set for the calculated steering angle acceleration α. The first determination reference value is a specific steering angle acceleration threshold +Th (α) for a right turn. The second determination reference value is a specific steering angle acceleration threshold −Th (α) (not shown) for a left turn. The absolute value of −Th (α) is the same as the value of +Th (α).

The value of ±Th (α) is set to 0 (zero), for example. In other words, the equality ±Th (α)=0 is satisfied.

For a right turn, the curve can be considered to have entered the determination reference area Aj when the detected steering angle θ exceeds the steering angle threshold +Th (θ) and the calculated steering angle speed ω exceeds the steering angle speed threshold +Th (ω). The controller 69 (see FIG. 3) determines that at least the driver 21 needs to be restrained when the curve has entered the determination reference area Aj, and the calculated steering angle acceleration α has exceeded the steering angle acceleration threshold +Th (α). Since the value of the steering angle acceleration threshold +Th (α) is 0, it is determined that +Th (α) has been exceeded if the value of the steering angle acceleration α is "+."

Steering to the left is treated in the same manner as steering to the right. In other words, the curve can be considered to have entered the determination reference area Aj when the absolute value of the steering angle θ exceeds the steering angle threshold −Th (θ) and the absolute value of the steering angle acceleration ω exceeds the steering angle speed threshold −Th (ω). The controller 69 (see FIG. 3) determines that at least the driver 21 needs to be restrained when the curve has entered the determination reference area Aj, and the absolute value of the steering angle acceleration α has exceeded the absolute value of the steering angle acceleration threshold −Th (α). Since the value of the steering angle acceleration threshold −Th (α) is 0, it is determined that −Th (α) has been exceeded if the value of the steering angle acceleration α is "−."

A specific example will now be described. In the first quadrant A1, the curve C1 is a "first characteristic curve" representing the change in the steering angle θ and the steering angle speed ω. The curve C2 is a "second characteristic curve" representing the change in the steering angle θ and the steering angle speed ω.

The slopes of the first and second characteristic curves C1, C2 represent the magnitude of the steering angle acceleration α. In other words, in cases in which the steering angle speed ω is constant regardless of the magnitude of the steering angle θ, the characteristic curves have no slope, and the steering angle acceleration α does not change (α=0). In cases in which the steering angle speed ω increases with increased steering angle θ, the characteristic curves slope upward and to the right in the first quadrant A1, and the steering angle acceleration α increases (α>0). In cases in which the steering angle speed ω decreases with increased steering angle θ, the characteristic curves slope downward and to the right in the first quadrant A1, and the steering angle acceleration α decreases (α<0).

Thus, if the characteristic curves C1, C2 slope upward and to the right, the result is α>Th (α); i.e., the value of the steering angle acceleration α is "+." If the characteristic curves C1, C2 slope downward and to the right, the result is α<Th (α); i.e., the value of the steering angle acceleration α is "−."

The first characteristic curve C1 represents a characteristic that constantly increases to the right in the first quadrant A1. Since this curve rises to the right even after entering the determination reference area Aj, the value of the steering angle acceleration α is "+." In this case, it is believed that rightward steering continues, and the steering wheel 19 is rapidly turned to the right. In other words, it can be presumed that the driver 21 has panicked (is in a state of mental confusion), and that there is a possibility that the vehicle 10 will be suddenly turned to the right.

At this time, the controller 69 (see FIG. 3) determines that at least the driver 21 needs to be restrained. The driving posture of the driver 21 can be maintained in an appropriate manner by restraining the driver 21 in the seat 31. As a result, the driver 21 can be kept in a correct driving state.

The second characteristic curve C2 temporarily slopes upward in the first quadrant A1, but begins to slope downward before entering the determination reference area Aj. In other words, the value of the steering angle acceleration α is "−" because the second characteristic curve C2 slopes downward upon entering the determination reference area Aj. This can be thought to be the result of a quick turn of the steering wheel 19 to the left (including with causing the vehicle 10 to make a U-turn, change direction, or make a continuous turn). In other words, it can be presumed that any sudden actions taken by the driver 21 with the steering wheel 19 are within an appropriate range. At this time, the controller 69 (see FIG. 3) determines that the driver 21 does not need to be restrained.

The value of the acceleration threshold Th (α) may be varied according to the behavior of the vehicle 10 while the vehicle is moving.

Figure 6:
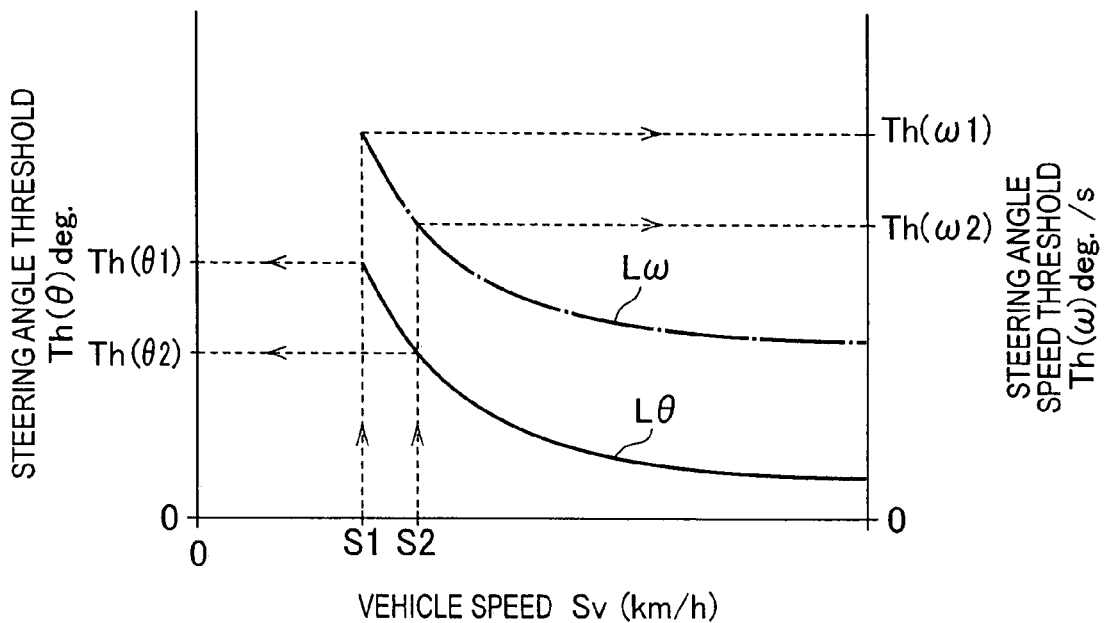
FIG. 6 is an explanatory view of a map for setting the steering angle threshold in the controller shown in FIG. 3.

The steering angle threshold ±Th (θ) and the steering angle speed threshold ±Th (ω) are changed to values that correspond to the vehicle speed Sv, as shown in FIG. 6.

FIG. 6 shows the relationship of the steering angle threshold Th (θ) and the steering angle speed threshold Th (ω) to the vehicle speed Sv, wherein the vehicle speed Sv is plotted on the horizontal axis, the steering angle threshold Th (θ) is plotted on the left vertical axis, and the steering angle speed threshold Th (ω) is plotted on the right vertical axis.

The unit of the vehicle speed Sv is "km/h." The unit of the steering angle threshold Th (θ) is "deg." The unit of the steering angle speed threshold Th (ω) is "deg./s."

The curve Lθ shown by the solid line is a steering angle threshold characteristic curve representing the characteristics of the steering angle threshold Th (θ) in relation to the vehicle speed Sv. The curve Lω shown by the single-dotted line is a steering angle speed threshold characteristic curve representing the characteristics of the steering angle speed threshold Th (ω) in relation to the vehicle speed Sv. The steering angle threshold characteristic curve Lθ and the steering angle speed threshold characteristic curve Lω both have a characteristic according to which a curve is made so that the threshold decreases as the vehicle speed Sv increases.

For example, at a comparatively low vehicle speed S1, the steering angle threshold Th (θ) is set to a high threshold Th (θ1), and at a vehicle speed S2, which is higher than the vehicle speed S1, the steering angle threshold Th (θ) is set to a low threshold Th (θ2). The reasons for setting the steering angle threshold Th (θ) in this manner are as follows.

When the vehicle 10 is steered while driven at a high speed, a considerable centrifugal force acts on the vehicle 10. Therefore, the posture of the driver 21 largely changes to the left or right. Accordingly, in order to keep the driver 21 in an appropriate posture in accordance with the present invention, the steering angle threshold Th (θ) is set to lower values at higher vehicle speeds.

At the comparatively low vehicle speed S1, the steering angle speed threshold Th (ω) is set to a high threshold Th (ω1), and at the vehicle speed S2, which is higher than the vehicle speed S1, the steering angle speed threshold Th (ω) is set to a lower value Th (ω2). The reasons for setting the steering angle speed threshold Th (ω) in this manner are as follows.

For example, the orientation of the steered wheels changes immediately when the steering wheel 19 is turned in order to turn the vehicle 10 while the vehicle is moving straight forward. However, inertia that is proportionate to the vehicle speed Sv acts on the vehicle 10. There is a temporary deviation (discrepancy) in the orientation of the wheels relative to the traveling direction of the vehicle 10. Therefore, the frictional resistance between the road surface and the wheels temporarily increases. The frictional resistance between the steered wheels and the road surface suddenly increases at higher vehicle speeds Sv even if the steering angle speed ω is constant. As a result, the braking force acts on the vehicle 10 in relation to the traveling direction of the vehicle 10. The driver 21 is subjected to strong acceleration that corresponds to the braking force. The posture of the driver 21 changes forward to a considerable extent in correspondence with the acceleration. The wheels also sideslip (skid sideways) in relation to the road surface.

Accordingly, in order to keep the driver 21 in an appropriate posture in accordance with the present invention, the steering angle speed threshold Th (ω) is set to lower values at higher vehicle speeds.

In the present invention, the controller 69 (see FIG. 3) is configured so that at least one parameter selected from the steering angle threshold Th (θ) and the steering angle speed threshold Th (ω) is changed to a value corresponding to the vehicle speed Sv. Therefore, keeping the driver 21 in an appropriate posture can stabilize the maneuvering undertaken by the driver 2l. Moreover, the maneuvering of the vehicle 10 as such can be kept stable.

The steering angle threshold characteristic curve Lθ and the steering angle speed threshold characteristic curve Lω shown in FIG. 6 are used as "threshold-setting maps" when the seatbelt apparatus 40 is controlled by the controller 69 (see FIG. 3). In other words, the steering angle threshold characteristic curve Lθ is a "map for setting the steering angle threshold" and calculating the steering angle threshold ±Th (θ) in accordance with the vehicle speed Sv. The steering angle speed threshold characteristic curve Lω is a "map for setting the steering angle speed threshold" and calculating the steering angle speed threshold ±Th (ω) in accordance with the vehicle speed Sv.

Data on the map Lθ for setting the steering angle threshold (steering angle threshold characteristic curve Lθ) and data on the map Lω for setting the steering angle speed threshold (steering angle speed threshold characteristic curve Lω are written into memory stored in the controller 69.

Figure 7A:
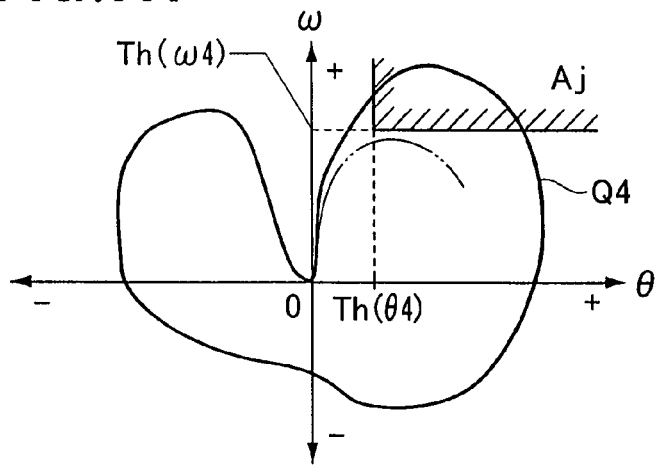
FIGS. 7A, 7B, and 7C are explanatory views for describing an example in which the vehicle is abruptly turned on the basis of the schematic view shown in FIGS. 5 and 6.
Figure 7B:
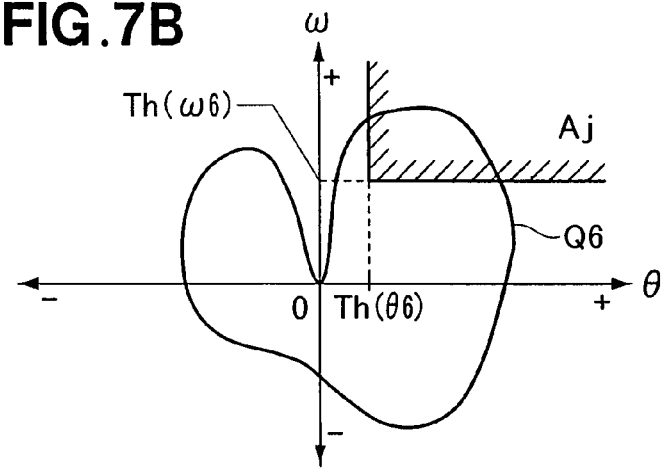
Figure 7C:
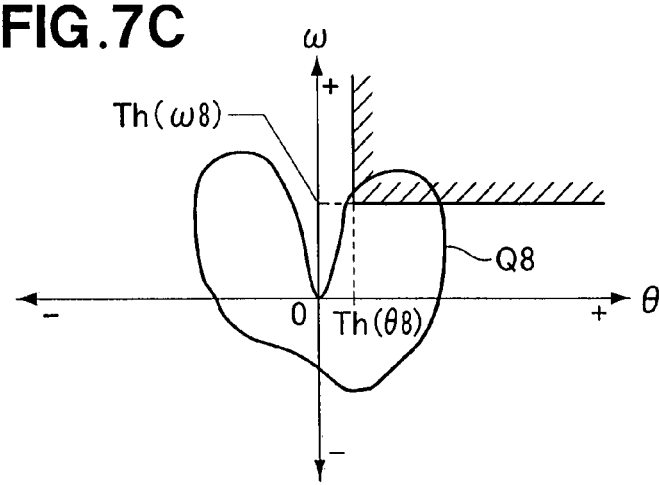

The following is a description, based on the schematic views in FIGS. 5 and 6 and made with reference to FIGS. 7A, 7B, and 7C, of the results of a test in which a vehicle is abruptly steered while moving under actual conditions. Specifically, three case examples were tested in which a vehicle was suddenly made to switch lanes on a test course.

FIGS. 7A, 7B, and 7C show the tested case examples, and the views substantially correspond to FIG. 5. In other words, FIGS. 7A, 7B, and 7C show the correlation between the steering angle θ and the steering angle speed ω and represent the steering angle characteristics of the steering wheel in the θ-ω coordinates, wherein the steering angle θ is plotted on the horizontal axis, and the steering angle speed ω is plotted on the vertical axis.

The first case example in FIG. 7A shows the steering angle characteristics Q4 (change in the steering angle θ and the steering angle speed ω) for a case in which the vehicle is traveling at a speed of 40 km/h (traveling at a low speed). According to the first case example, since the vehicle is traveling at a low speed, it is clear that both the steering angle θ and the steering angle speed ω must be high in order for the vehicle to suddenly change lanes. Although both the steering angle θ and the steering angle speed ω are high, the centrifugal force and acceleration at low speeds have little effect on the driver. Therefore, when the vehicle speed is 40 km/h, the steering angle threshold is set to a high Th (θ4), and the steering angle speed threshold is set to a high Th (ω4).

As shown by the double-dotted line, in cases in which neither the steering angle threshold Th (θ4) nor the steering angle speed threshold Th (ω4) is exceeded, the occupant does not need to be restrained regardless of the extent of the steering angle acceleration α.

The second case example in FIG. 7B shows the steering angle characteristics Q6 in a case in which the vehicle is traveling at a speed of 60 km/h (traveling at a moderate speed). According to the second case example, since the vehicle is traveling at a moderate speed, it is clear that both the steering angle θ and the steering angle speed ω are kept lower than in the first case example in order for the vehicle to suddenly change lanes. If the steering angle θ and the steering angle speed ω are high at a moderate speed, the driver is subject to strong centrifugal force and acceleration. When the effects of centrifugal force and acceleration that act on the driver are taken into consideration, the thresholds must be set lower than in the first case example in order to stabilize the maneuvering undertaken by the driver. Therefore, when the vehicle speed is 60 km/h, the steering angle threshold is set to Th (θ6), and the steering angle speed threshold is set to Th (ω6). The relations Th (θ4)>Th (θ6), and Th (ω4)>Th (ω6) are satisfied.

The third case example in FIG. 7C shows the steering angle characteristics Q8 when the vehicle is traveling at 80 km/h (traveling at a high speed). According to the third case example, since the vehicle is traveling at a high speed, it is clear that both the steering angle θ and the steering angle speed ω are kept even lower than in the second case example in order for the vehicle to suddenly change lanes. If the steering angle θ and the steering angle speed ω are high at a high speed, the driver is subject to extremely strong centrifugal force and acceleration. The effects of centrifugal force and acceleration on the driver are strong. In other words, the posture of the driver changes considerably to the left and right due to strong centrifugal force. The posture of the driver also changes forward due to strong acceleration. The thresholds must be set lower than in the second case example in order to keep the maneuvering of the driver stable. Therefore, when the vehicle speed is 80 km/h, the steering angle threshold is set to Th (θ8), and the steering angle speed threshold is set to Th (ω6). The relations Th (θ6)>Th (θ8), and Th (ω6)>Th (ω8) are satisfied.

Figure 8:
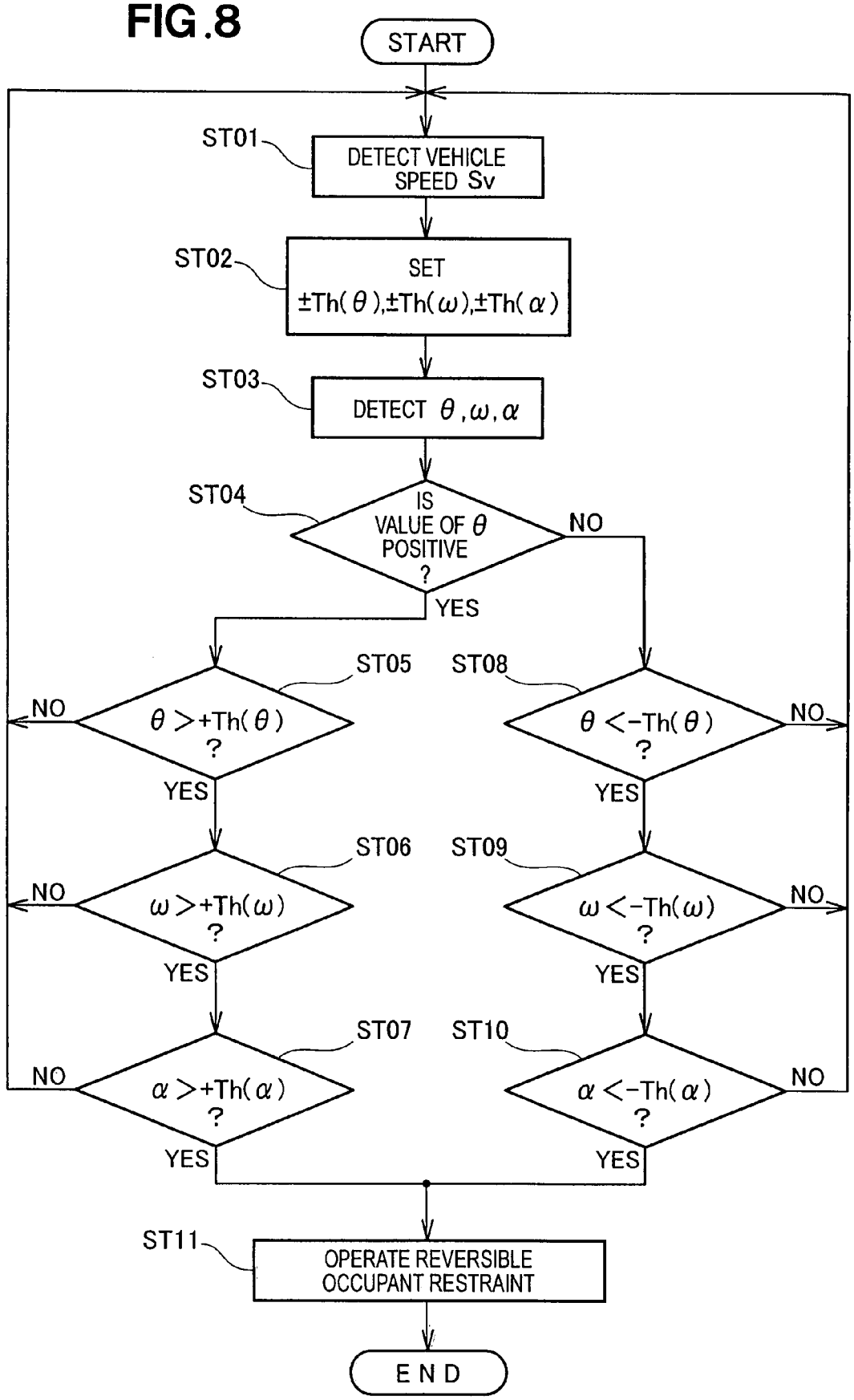
FIG. 8 is a control flowchart of the controller shown in FIG. 3.

The following is a description of the control flow in a case in which the controller 69 shown in FIG. 3 is a microcomputer. The control flow is described hereinbelow based on FIG. 8, with reference to FIGS. 1 and 2.

Step (hereinafter abbreviated as ST) ST01: The vehicle speed Sv is detected.

ST02: The steering angle threshold ±Th (θ), the steering angle speed threshold ±Th (ω), and the steering angle acceleration threshold ±Th (α) are set. For example, the steering angle threshold characteristic curve Lθ (map for setting the steering angle threshold) shown in FIG. 6 is used for the steering angle threshold ±Th (θ), and is set to a value that corresponds to the vehicle speed Sv. The steering angle speed threshold characteristic curve Lω (map for setting the steering angle speed threshold) shown in FIG. 6 is used for the steering angle speed threshold ±Th (ω), and is set to a value that corresponds to the vehicle speed Sv.

ST03: The steering angle θ, the steering angle speed ω, and the steering angle acceleration α are obtained.

ST04: A determination is made as to whether the value of the steering angle θ is "+" (positive). The process advances to ST05 if the result is YES, and to ST08 is the result is NO. If the value of the steering angle θ is "+," the steering wheel 19 is being turned to the right. If the value of the steering angle θ is "−," the steering wheel 19 is being turned to the left.

ST05: A determination is made as to whether "θ>(+Th (θ))"; i.e., whether the steering angle θ exceeds the steering angle threshold ±Th (θ). If the result is YES, the process advances to ST06, and if the result is NO, the process returns to ST01.

ST06: A determination is made as to whether "ω>(+Th (ω))"; i.e., whether the steering angle speed ω exceeds the steering angle speed threshold +Th (ω). If the result is YES, the process advances to ST07, and if the result is NO, the process returns to ST01.

ST07: A determination is made as to whether "α>(+Th (α))"; i.e., whether the steering angle acceleration α exceeds the steering angle acceleration threshold +Th (α). If the result is YES, the process advances to ST11, and if the result is NO, the process returns to ST01.

ST08: A determination is made as to whether "θ<(−Th (θ))"; i.e., whether the steering angle θ exceeds the steering angle threshold −Th (θ) as an absolute value. If the result is YES, the process advances to ST09, and if the result is NO, the process returns to ST01.

ST09: A determination is made as to whether "ω<(−Th (ω))"; i.e., whether the steering angle speed ω exceeds the steering angle speed threshold −Th (ω) as an absolute value. If the result is YES, the process advances to ST10, and if the result is NO, the process returns to ST01.

ST10: A determination is made as to whether "α<(−Th (α))"; i.e., whether the steering angle acceleration α exceeds the steering angle acceleration threshold −Th (α) as an absolute value. If the result is YES, the process advances to ST11, and if the result is NO, the process returns to ST01.

ST11: Control based on this control flow is complete after the reversible occupant restraint 40 (seatbelt apparatus 40) is operated. For example, controlling the belt electric motor 52 causes the slack in the seatbelt 42 to be wound up by the electric pretensioner 51. Controlling the belt electric motor 52 also regulates the manner in which the seatbelt 42 is advanced from the electric pretensioner 51. As a result, the seatbelt 42 restrains the occupant 21.

Next, a modification of the vehicle occupant restraint apparatus 30 will be described with reference to FIG. 9.

FIG. 9 shows the control circuitry of a modified vehicle occupant restraint apparatus 80, and corresponds to FIG. 3. In the modified vehicle occupant restraint apparatus 80, the reversible occupant restraint 40 (seatbelt apparatus 40) of the embodiment shown in FIG. 3 is changed to reversible occupant restraints 35 (side support apparatuses 35). The configuration is otherwise identical to the embodiment shown in FIGS. 1 through 6 and FIG. 8, and therefore the same numerical symbols are used and descriptions are omitted.

The controller 69 of the vehicle occupant restraint apparatus 80 controls the left- and right-support electric motors 38, 38 of the reversible occupant restraints 35, as shown in FIGS. 1 and 2. The left- and right-support electric motors 38, 38 drive the left and right side supports 36, 36 in the direction in which the occupant 21 is restrained.

Particularly, strong centrifugal force acts on the occupant 21 in the left and right directions (lateral direction) during abrupt steering. At this time, the occupant 21 is restrained by the left and right side supports 36, 36, whereby the occupant 21 is prevented from moving to the left and right (swinging sideways).

Figure 10A:
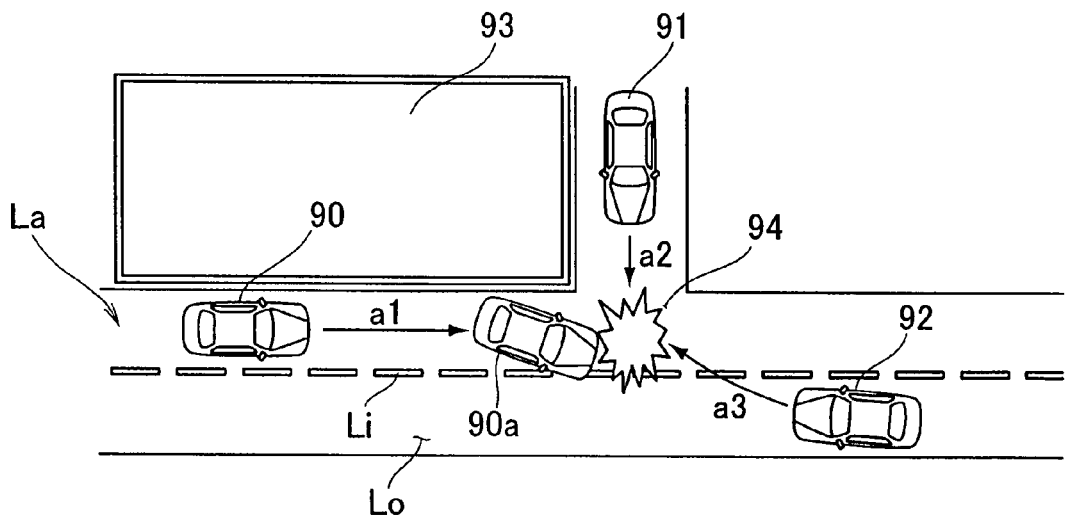
FIGS. 10A, 10B, and 10C are explanatory views of a preferred case example of using the vehicle occupant restraint apparatus shown in FIG. 3.
Figure 10B:
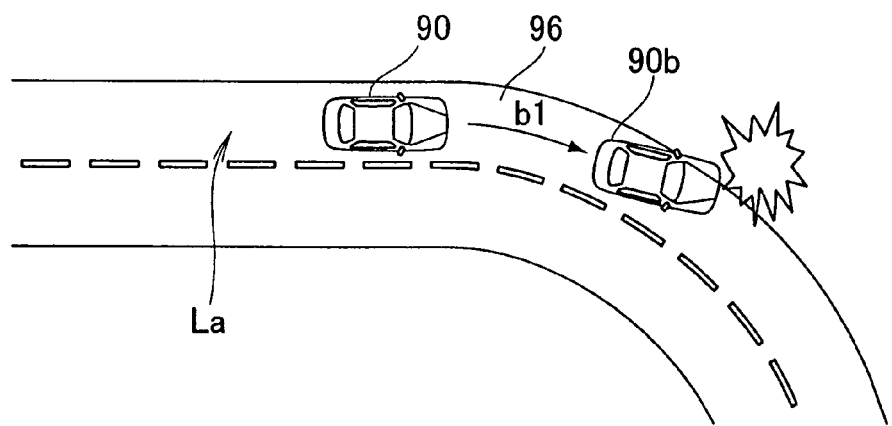
Figure 10C:
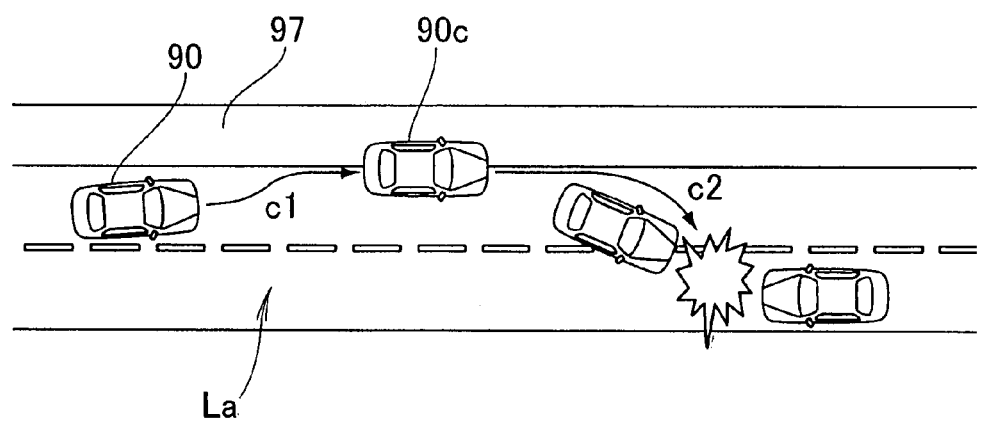
Figure 11:
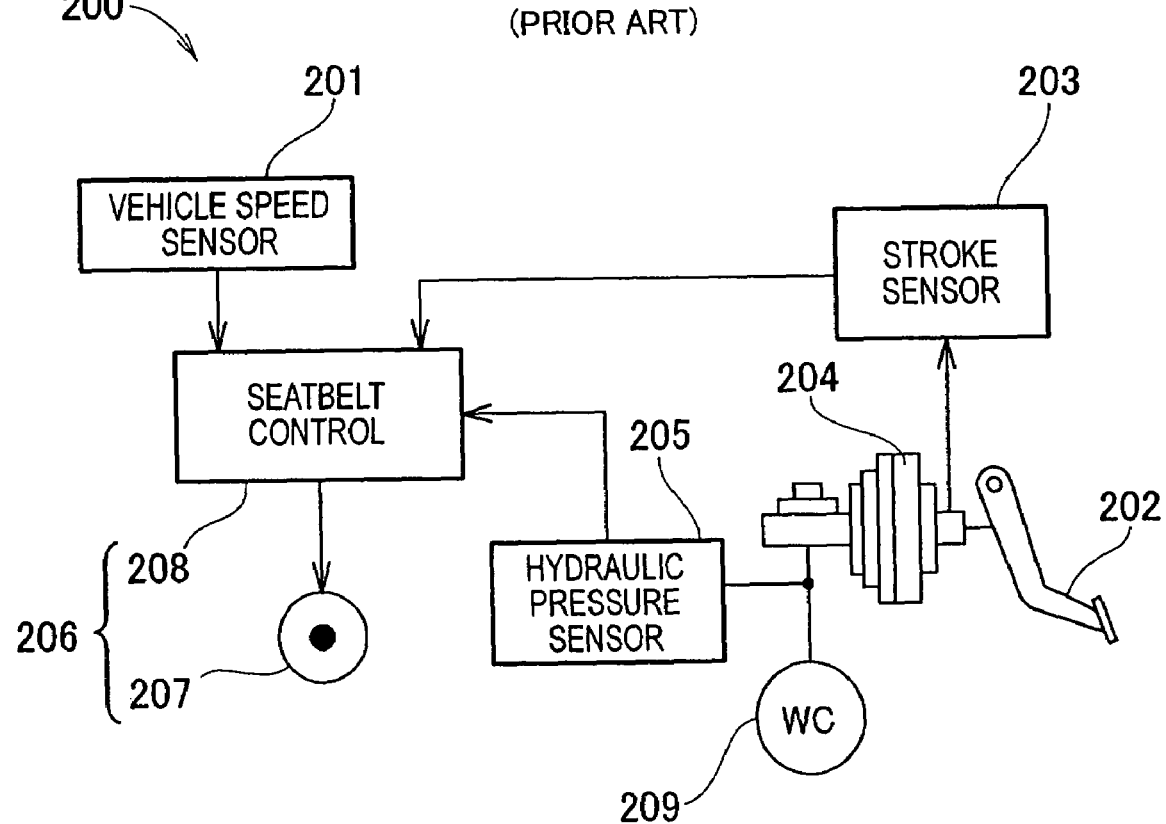
FIG. 11 is a block diagram of a conventional vehicle occupant restraint apparatus.

The following is a description, made with reference to FIGS. 10A, 10B, and 10C, of preferred case examples in which the reversible occupant restraints 35, 40 are controlled by the vehicle occupant restraint apparatus 30, 80.

The first case example shown in FIG. 10A is a case in which a vehicle 90 (automobile 90) is driven into an intersection 94 having poor visibility. In cases in which a building 93 is erected along the intersection 94, visibility may be poor in the proximity of the intersection 94.

For example, the automobile 90 directly approaching from the left of the road La will pass through the intersection 94, as shown by the arrow a1. A case is presented wherein another vehicle 91 (other automobile 91) approaches the intersection 94 from the other side of the building 93 on the left at the same time, as shown by the arrow a2. At this time, the driver of the automobile 90 suddenly swerves to the right in order to avoid the other automobile 91. The suddenly swerving automobile is shown by the numerical symbol 90a.

If the automobile 90a crosses the center dividing line Li and enters the oncoming vehicle path Lo, an oncoming vehicle 92 may approach the automobile 90a. At this time, if the oncoming vehicle 92 turns to the right as shown by the arrow a3, a collision with the automobile 90a can be avoided. However, the oncoming vehicle 92 may also continue driving straight. At this time, there is a possibility that the driver of the automobile 90a will lapse into a panicked state (a state of mental confusion). In other words, there is a possibility that the driver will panic and resort to abrupt steering.

Next, the second case example shown in FIG. 10B is a case in which a vehicle 90 is traveling at a high speed over a curve 96 on an icy road La. A case is assumed in which the vehicle 90 traveling at a high speed fails to turn properly and deviates from the road as shown by the arrow b1. The vehicle that has deviated from the road is shown by the numerical symbol 90b. At this time, there is a possibility that the driver of the automobile 90b will lapse into a panicked state (a state of mental confusion). In other words, there is a possibility that the driver will panic and turn the vehicle in an abrupt manner.

Next, the third case example shown in FIG. 10C is a case in which a vehicle 90 traveling over a road La moves onto the shoulder 97. Gravel is commonly scattered over the shoulder 97. The gravel sometimes piles up. A case is presented in which the moving vehicle 90 deviates from the road as shown by the arrow c1 and moves onto the shoulder 97. The vehicle that has deviated from the road is shown by the numerical symbol 90c. At this time, the state of the road surface over which the vehicle 90 is traveling changes greatly. As a result of the abrupt change in the state of the road surface, the vehicle 90 may suddenly move back into the road La from the shoulder 97 as shown by the arrow c2. At this time, there is a possibility that the driver of the automobile 90c will lapse into a panicked state (a state of mental confusion). In other words, there is a possibility that the driver will panic and turn the vehicle in an abrupt manner.

In the case examples described above, it is particularly preferred that the reversible occupant restraints 35, 40 be controlled by the vehicle occupant restraint apparatus 30 shown in FIG. 3 and the vehicle occupant restraint apparatus 80 shown in FIG. 9.

In the present invention, another possibility is a configuration that combines the vehicle occupant restraint apparatus 30 shown in FIG. 3 and the vehicle occupant restraint apparatus 80 shown in FIG. 9. In other words, a configuration may be designed so that the two reversible occupant restraints 35, 40 are operated by control signals from the controller 69.

The absolute values of the thresholds −Th (θ), −Th (ω), and −Th (α) for left steering may each be set to different values than the thresholds +Th (θ), +Th (ω), and +Th (α) for right steering.

The reversible occupant restraints 35, 40 may also be designed to operate based on different steering conditions for the driver's seat and for other seats. In other words, the thresholds ±Th (θ), ±Th (ω), and ±Th (α) for cases in which the reversible occupant restraints 35, 40 of another seat is operated may be different than the thresholds ±Th (θ), ±Th (ω), and ±Th (α) for cases in which the reversible occupant restraints 35, 40 of the driver's seat are operated.

The vehicle occupant restraint apparatus 30, 80 of the present invention can be used in sedans, wagons, and other occupant vehicles.

Obviously, various minor changes and modifications of the present invention are possible in light of the above teaching. It is therefore to be understood that within the scope of the appended claims the invention may be practiced otherwise than as specifically described.

What is claimed is:

1. A vehicle occupant restraint apparatus comprising:
   a steering angle detector for detecting a steering angle of a steering device;
   a steering angle speed calculator for calculating a steering angle speed of the steering device;
   a steering angle acceleration calculator for calculating a steering angle acceleration of the steering device;
   a reversible occupant restraint capable of operating both in a direction of restraining an occupant and in a direction of releasing the restraining; and
   a controller for controlling the reversible occupant restraint,
   wherein the controller is designed to control the reversible occupant restraint in such a manner as to restrain the occupant when a determination is made that three conditions, a first condition that the steering angle has exceeded a predetermined steering angle threshold, a second condition that the steering angle speed has exceeded a predetermined steering angle speed threshold, and a third condition that the steering angle acceleration has exceeded a predetermined steering angle acceleration threshold, have been met.

2. The restraint apparatus of claim 1, further comprising a vehicle speed detector for detecting a speed of a vehicle, and wherein the controller changes at least one parameter selected from the steering angle threshold, the steering angle speed threshold, and the steering angle acceleration threshold to a value corresponding to the vehicle speed.

3. The restraint apparatus of claim 1, wherein the reversible occupant restraint restrains the occupant sitting in the driver's seat.

4. The restraint apparatus of claim 1, wherein the reversible occupant restraint comprises a seatbelt apparatus, and the seatbelt apparatus is designed to perform, upon receipt of a control signal from the controller, either an operation for retracting a seatbelt by a drive force of a seatbelt electric motor, or an operation for restricting pull-out of the seatbelt.

5. The restraint apparatus of claim 1, wherein the reversible occupant restraint comprises left and right side supports provided to a seat for accommodating the occupant and allowed to swing laterally of the vehicle, and left- and right-support electric motors for driving the left and right side supports, and the left- and right-support electric motors, upon receipt of a control signal from the controller, drive the left and right side supports in a direction in which the occupant is restrained.

* * * * *